United States Patent
Tione et al.

(10) Patent No.: US 12,179,813 B2
(45) Date of Patent: Dec. 31, 2024

(54) MONITORING SYSTEM FOR AT LEAST ONE PLURALITY OF HOMOGENEOUS DEVICES OF AT LEAST ONE RAILWAY VEHICLE

(71) Applicant: FAIVELEY TRANSPORT ITALIA S.P.A., Turin (IT)

(72) Inventors: Roberto Tione, Turin (IT); Matteo Frea, Turin (IT)

(73) Assignee: Faiveley Transport Italia S.P.S., Turin (IT)

( * ) Notice: Subject to any disclaimer, the term of this patent is extended or adjusted under 35 U.S.C. 154(b) by 282 days.

(21) Appl. No.: 17/905,148

(22) PCT Filed: Mar. 11, 2021

(86) PCT No.: PCT/IB2021/052024
§ 371 (c)(1),
(2) Date: Aug. 26, 2022

(87) PCT Pub. No.: WO2021/181322
PCT Pub. Date: Sep. 16, 2021

(65) Prior Publication Data
US 2023/0113694 A1    Apr. 13, 2023

(30) Foreign Application Priority Data
Mar. 11, 2020   (IT) .................. 102020000005194

(51) Int. Cl.
*B61L 15/00*     (2006.01)
*G05B 13/02*     (2006.01)
*G05B 23/02*     (2006.01)

(52) U.S. Cl.
CPC ....... *B61L 15/0081* (2013.01); *B61L 15/0018* (2013.01); *G05B 13/027* (2013.01); *G05B 23/0235* (2013.01)

(58) Field of Classification Search
CPC ............ B61L 15/0081; B61L 15/0018; G05B 13/027; G05B 23/0235
See application file for complete search history.

(56) References Cited

FOREIGN PATENT DOCUMENTS

DE   102017213186 A1   1/2019
DE   102017215341 A1   3/2019
(Continued)

OTHER PUBLICATIONS

Fu, Y. et al., "High-Speed Railway Bogie Fault Diagnosis Using LSTM Neural Network," Proceedings of the 2018 37th Chinese Control Conference (CCC), Jul. 25, 2018, Wuhan, China, 5 pages.
(Continued)

*Primary Examiner* — Mathew Franklin Gordon
(74) *Attorney, Agent, or Firm* — K&L Gates LLP (57) ABSTRACT

A monitoring system is described for a plurality of homogeneous devices, of at least one railway vehicle, wherein a functional state of each device is represented by a respective value of at least one operating quantity common to the devices. The monitoring system comprises:
  a control means which acquires, in a succession of acquisition instants, values of the operating quantity; each value is representative of the functional state of a respective device in an acquisition instant;
  diagnostic means which receive the values acquired in an acquisition instant and detect an operating anomaly or a maintenance request from at least one device as a function of a comparison, for each acquisition instant, of the values received with a range of reference values comprising a reference value determined as a function of at least two values acquired in an acquisition instant.

20 Claims, 6 Drawing Sheets

(56) References Cited

FOREIGN PATENT DOCUMENTS

| | | |
|---|---|---|
| WO | 2016041756 A1 | 3/2016 |
| WO | 2019219756 A1 | 11/2019 |

OTHER PUBLICATIONS

ISA European Patent Office, International Search Report Issued in Application No. PCT/IB2021/052024, Jun. 14, 2021, WIPO, 3 pages.

|     | X(t) | Y(t) | Z(t) |  |  | H(t) | K(t) | J(t) |
|-----|------|------|------|--|--|------|------|------|
| 1   | $x_1(aT)$ | $y_1(aT)$ | $z_1(aT)$ |  |  | $h_1(aT)$ | $k_1(aT)$ | $j_1(aT)$ |
| 2   | $x_3(aT)$ | $y_3(aT)$ | $z_3(aT)$ |  |  | $h_3(aT)$ | $k_3(aT)$ | $j_3(aT)$ |
| 3   | $x_n(aT)$ | $y_n(aT)$ | $z_n(aT)$ |  |  | $h_n(aT)$ | $k_n(aT)$ | $j_n(aT)$ |
|     |      |      |      |  |  |      |      |      |
| r-1 | $x_2(bT)$ | $y_2(bT)$ | $z_2(bT)$ |  |  | $h_2(bT)$ | $k_2(bT)$ | $j_2(bT)$ |
| r   | $x_1(bT)$ | $y_1(bT)$ | $z_1(bT)$ |  |  | $h_1(bT)$ | $k_1(bT)$ | $j_1(bT)$ |
| r+1 | $x_n(bT)$ | $y_n(bT)$ | $z_n(bT)$ |  |  | $h_n(bT)$ | $k_n(bT)$ | $j_n(bT)$ |

FIG.5

MONITORING SYSTEM FOR AT LEAST ONE PLURALITY OF HOMOGENEOUS DEVICES OF AT LEAST ONE RAILWAY VEHICLE

CROSS REFERENCE TO RELATED APPLICATIONS

The present application is a U.S. National Phase of International Application No. PCT/IB2021/052024 entitled "MONITORING SYSTEM FOR AT LEAST ONE PLURALITY OF HOMOGENEOUS DEVICES OF AT LEAST ONE RAILWAY VEHICLE," and filed on Mar. 11, 2021. International Application No. PCT/IB2021/052024 claims priority to Italian Patent Application No. 102020000005194 filed on Mar. 11, 2020. The entire contents of each of the above-listed applications are hereby incorporated by reference for all purposes.

TECHNICAL FIELD

This invention relates, in general, to the field of railway vehicles. In particular, the invention refers to a monitoring system for at least one plurality of homogeneous devices of at least one railway vehicle, in particular for safety applications in the field of railway transport.

PRIOR ART

Figure 1:
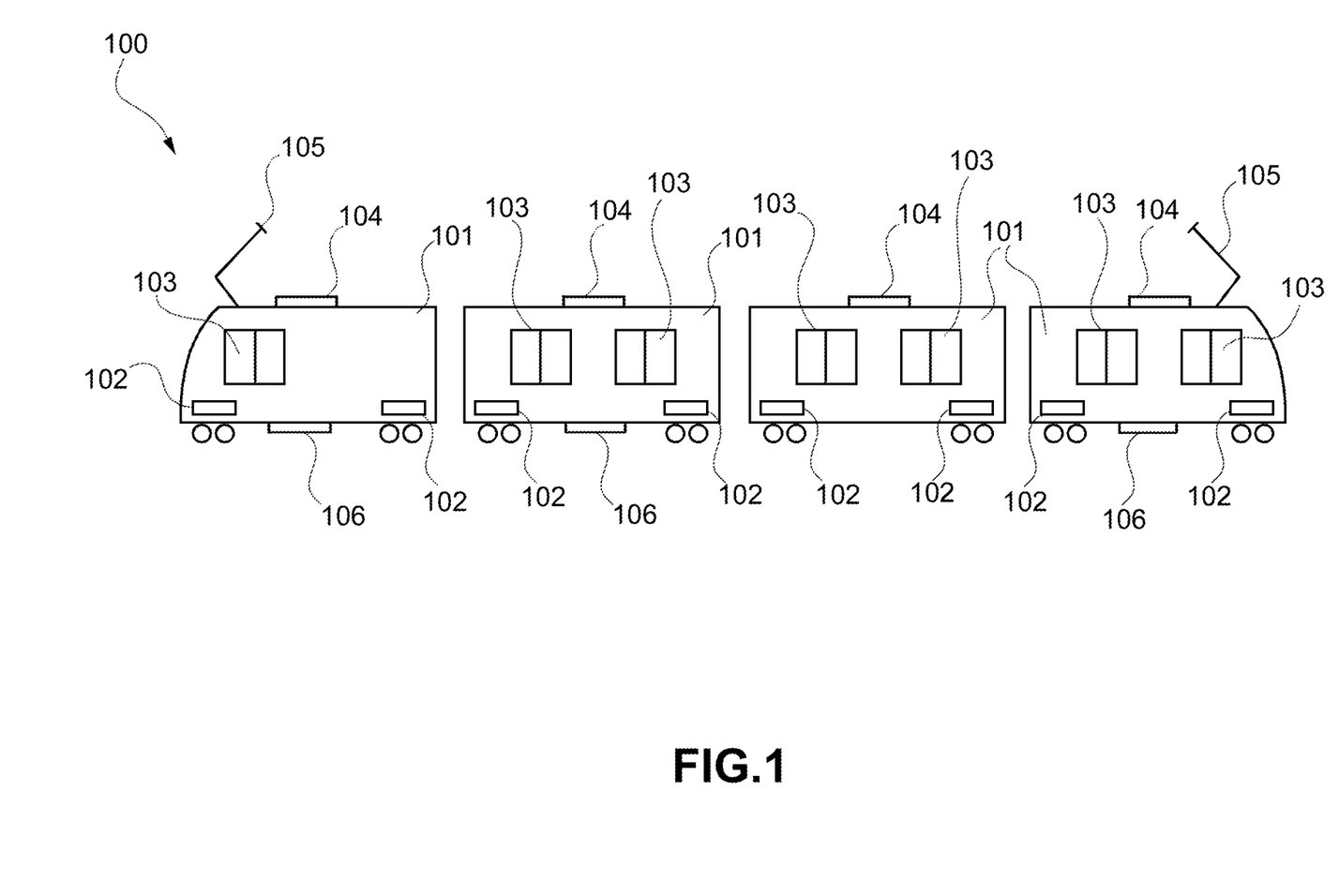
FIG. 1 shows an example of a known railway train of modern design.

A railway train 100 of modern design is illustrated in FIG. 1.

The railway train 100 is composed of a plurality of vehicles 101, each of which is equipped with at least one braking system 102, at least one access door system 103, and at least one air conditioning and heating unit 104.

Furthermore, the railway train 100 is equipped with a plurality of pantographs 105 and a plurality of units for generating, filtering, and drying compressed air 106.

The train 100 is equipped with other pluralities of systems or components, not shown in the figure, such as for example but not exclusively bogie suspension units, toilets, etc.

The previously illustrated systems are each controlled by one or more electronic control units, not illustrated in the figure. The electronic control units communicate with each other through a communication means of a typically serial nature, which is also not illustrated in FIG. 1.

Each electronic control unit acquires electrical signals from transducers adapted to measure operating quantities characteristic of the system to which they are associated and generates electrical control signals to control the associated system. Each control unit, based on the analysis of these electrical signals, performs diagnostic functions as well as control functions.

The diagnostic functions normally perform the comparison between the operating quantities measured or generated by the respective electronic control units, possibly preprocessed, with diagnostic comparison parameters preloaded in the non-volatile memory of said electronic control units. The diagnostic parameters are characteristic of the correct operating state, the pre-alarm state, and the alarm state of a system. The diagnostic parameters are defined in the system design phase.

Said diagnostic parameters, if designed on the basis of purely theoretical calculations or on the basis of laboratory experiments, often require further revisions based on the operating conditions of the train.

Document WO2016041756 claims various aspects of a method for performing diagnostic functions on systems and/or components on board a railway vehicle, and in particular a method for updating the diagnostic algorithms on board a train and/or the related parameters from a remote server.

In everyday life, for reasons of operational security and cybersecurity, railway operators are hostile to remote access to operating or diagnostic parameters of on-board vehicle systems.

SUMMARY OF INVENTION

An object of this invention is thus to provide a monitoring system for at least one plurality of homogeneous devices of at least one railway vehicle which is independent of the need for remote updates.

The aforesaid and other objects and advantages are achieved, according to an aspect of the invention, by a monitoring system for at least one plurality of homogenous devices of at least one railway vehicle having the features defined in claim 1. Preferred embodiments of the invention are defined in the dependent claims, the content of which is to be understood as an integral part of this description.

BRIEF DESCRIPTION OF THE DRAWINGS

The functional and structural features of some preferred embodiments of an electronic control system for emergency and service braking according to the invention will now be described. Reference is made to the appended drawings, wherein.

DETAILED DESCRIPTION

Before describing a plurality of embodiments of the invention in detail, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

Figure 2:
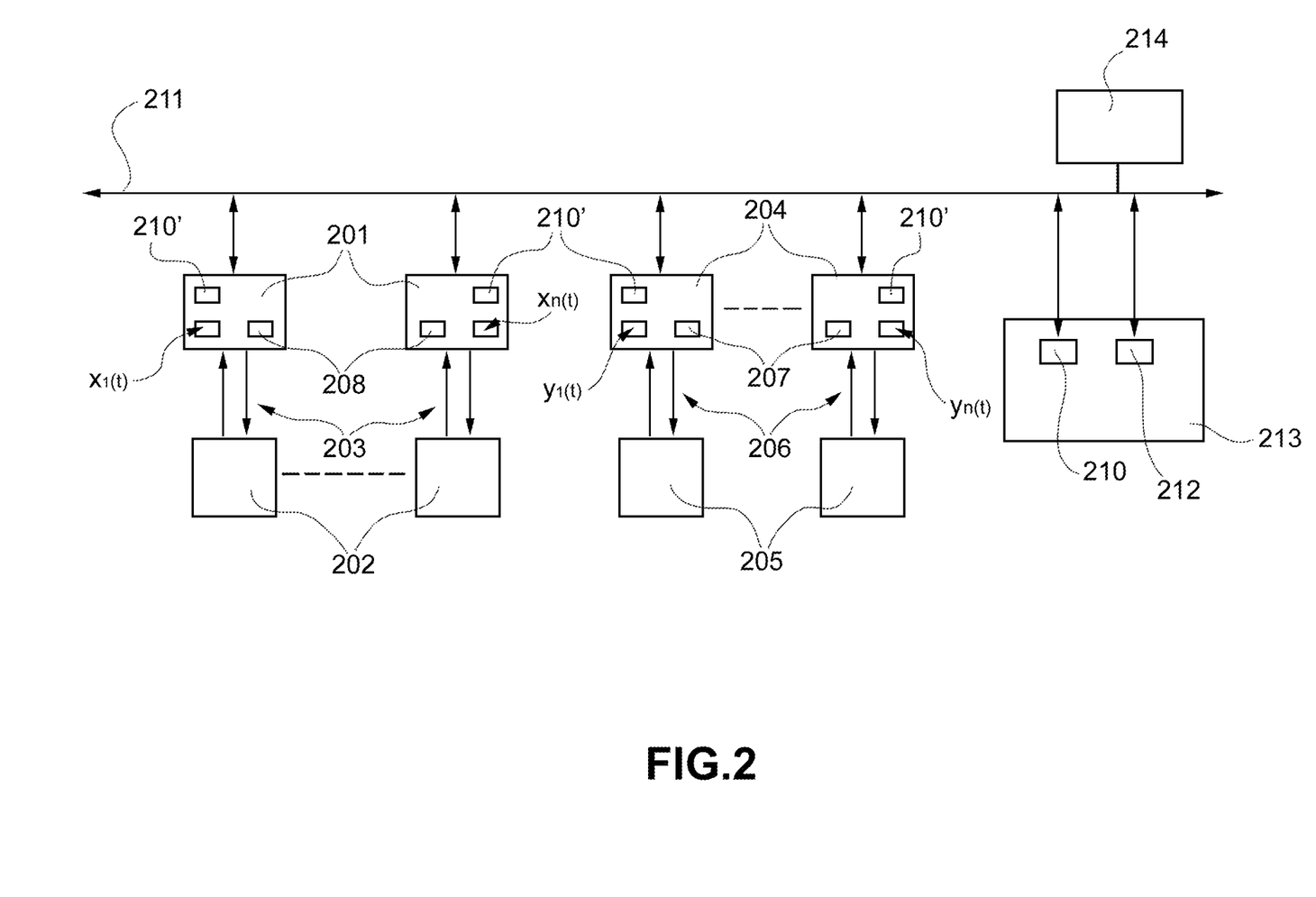
FIG. 2 shows an embodiment of a monitoring system for at least one plurality of homogeneous devices of at least one railway vehicle.

Embodiments of a monitoring system for at least one plurality of homogeneous devices 202, 205 of at least one railway vehicle 101 are described below.

FIG. 2 illustrates an embodiment of a monitoring system for at least one plurality of homogeneous devices 202, 205 of at least one railway vehicle 101.

The functional state of each device 202, 205 is represented by a respective value x1, x2; y1, y2 of at least one operating quantity $X(t), Y(t), \ldots$ common to the plurality of devices 202, 205.

The monitoring system comprises at least one control means 201, 204 designed to acquire, in a succession of acquisition instants $T_i, T_{i+1}, T_{i+2}, \ldots$ determined according to a predetermined acquisition period $T_i$, a plurality of values $x1(t_i, t_{i+1}, t_{i+2}, \ldots), x2(t_i, t_{i+1}, t_{i+2}, \ldots); y1(t_i, t_{i+1}, t_{i+2}, \ldots), y2(t_i, t_{i+1}, t_{i+2}, \ldots)$ of said at least one operative quantity $X(t); Y(t); \ldots$. Each value of said plurality of values $(x1(t_i, t_{i+1}, t_{i+2}, \ldots), x2(t_i, t_{i+1}, t_{i+2}, \ldots); y1(t_i, t_{i+1}, t_{i+2}, \ldots), y2(t_i, t_{i+1}, t_{i+2}, \ldots))$ being representative of the functional state of a respective device of said at least one plurality of devices 202, 205 in the acquisition instants $T_i, T_{i+1}, T_{i+2}, \ldots$.

Furthermore, the monitoring system comprises diagnostic means 210, 210' arranged to receive, through a communication means 211, the plurality of values $x1(t_i, t_{i+1}, t_{i+2}, \ldots), x2(t_i, t_{i+1}, t_{i+2}, \ldots); y1(t_i, t_{i+1}, t_{i+2}, \ldots), y2(t_i, t_{i+1}, t_{i+2}, \ldots)$ acquired in an acquisition instant. The diagnostic means 210, 210' are also arranged to detect a malfunction or a maintenance request of at least one of said devices, as a function of a comparison of said plurality of values $x1(t_i, t_{i+1}, t_{i+2}, \ldots), x2(t_i, t_{i+1}, t_{i+2}, \ldots); y1(t_i, t_{i+1}, t_{i+2}, \ldots), y2(t_i, t_{i+1}, t_{i+2}, \ldots))$ received with at least one range of reference values.

The range of reference values comprises a reference value Mx, My, . . . and a neighborhood of values ΔMx, ΔMy, . . . associated with said reference value Mx, My, . . . .

The reference value Mx, My, . . . is determined by the diagnostic means 210, 210' as a function of at least two values of said plurality of values $x1(t_i, t_{i+1}, t_{i+2}, \ldots), x2(t_i, t_{i+1}, t_{i+2}, \ldots); y1(t_i, t_{i+1}, t_{i+2}, \ldots), y2(t_i, t_{i+1}, t_{i+2}, \ldots)$, acquired in an acquisition instant.

The diagnostic means may be set up to determine the reference value Mx, My, . . . at each acquisition instant.

The diagnostic means may be arranged to determine the neighborhood of values ΔMx, ΔMy, . . . at each acquisition instant.

The definition of homogeneous devices 202, 205 of at least one railway vehicle 101 is explained in detail below. "Plurality of homogeneous devices" refers to the set of at least two devices 202, 205, performing the same functionality on board the at least one railway vehicle 101 or railway train 100.

The at least one control means 201, 204 is arranged to control said homogeneous devices 202; 205. The control means may be only one and control all the homogeneous devices, or rather the control means may be more than one and control each at least one respective homogeneous device. In the second case, the control means are also homogeneous with each other.

"Control means" may refer, for example, to a control unit, a controller, a processor, a control module, a control unit, etc.

By way of non-exclusive example, the plurality of homogeneous devices 202 may be two devices of at least two door systems 103 of the railway vehicle 101 or train 100, the movement of the doors being controlled by the control means 201. In a further non-limiting example, the plurality of homogeneous devices 205 may be at least two devices of electro-pneumatic braking systems 102 and/or related braking actuators of the railway vehicle 101 or train 100.

Observing FIG. 2, the control means 201, 204 may exchange a plurality of signals, respectively 203, 206, with the associated homogeneous devices, 202 and/or 205, respectively.

The plurality of signals 203, 206 may comprise input signals coming from transducers adapted to measure operating quantities characteristic of the associated device and may comprise output signals arranged to control the associated device.

By way of non-exclusive example, in the case wherein the plurality of homogeneous devices comprises devices of door systems 103, the plurality of signals 203, 206 may comprise input signals, including rotation speed and position signals of electric motion motors of the doors and end-of-travel signals of the doors, and may comprise output signals, including signals for controlling the power of the electric motors for moving the doors. An example of a plurality of homogeneous devices of a door system may therefore be, for example, a plurality of electric motors for moving the doors, or end-of-travel devices.

As a further non-exclusive example, in the case wherein the plurality of homogeneous devices are devices of braking systems 102, the signals 203, 206 may comprise input signals, including axle speed signals, signals from various linear or binary pressure sensors adapted to monitor pneumatic pressures at various points of the associated braking system, and may comprise output signals, including control signals of pneumatic solenoid valves used for controlling pressure. An example of a plurality of homogeneous devices of braking systems 102 may therefore be, for example, a plurality of speed sensors, a plurality of linear or binary pressure sensors, or a plurality of pneumatic solenoid valves.

In one embodiment, the at least one operating quantity $X(t), Y(t), \ldots$ comprises values directly acquired or generated by the at least one control means 201, 204 or values/measures entered from the outside manually or remotely via, for example, a maintenance software tool. In a further embodiment, in order to prepare data for diagnostic analyses, the at least one operating quantity $X(t), Y(t), \ldots$ may comprise values obtained from preprocessing performed by the at least one control means 201, 204 on the at least one operating quantity directly acquired or generated by the at least one control means 201, 204.

In other words, the control means 201, 204 may be arranged to perform preprocessing functions 208, 207 on the quantities represented by the signals 203, 206.

In the event that the plurality of homogeneous devices belongs to braking systems 102, the preprocessing functions 207, 208 may include brake pressure application counters at the brake cylinders over a specified period of time, the distance traveled in a given period of time obtained by integrating the speed signals from the axles over time, and the number of activations of each pneumatic solenoid valve in a given period of time.

In the event wherein the plurality of homogeneous devices belongs to door systems 103, the preprocessing functions 207, 208 may comprise identifiers of the maximum peak value of the current to the door actuation motors, or counters of the number of openings of each door in a given period of time, or the total electrical energy consumed by each electric motor for moving the doors in a given period of time.

The control means 201, 204 may share the quantities represented respectively by the signals 203, 206, possibly preprocessed by the preprocessing functions 208, 207, respectively, through a communication means 211. The communication means 211 may be of the wired type or of the wireless type.

The definition of operating quantity X(t), Y(t), . . . common to the plurality of devices 202, 205 is explained in detail below.

"Common operating quantity X(t), Y(t), . . . " refers to a quantity having the same meaning and the same dimensions, and which is associated with at least two devices forming part of a plurality of homogeneous devices 202, 205.

A first non-exclusive example of operating quantity X(t) is represented by the current absorbed by each electric actuating motor of each of the door systems 103 of the same railway vehicle 101 or train 100, where x1(t) is the current absorbed by a first homogeneous device, i.e., a first electric motor associated with a first door 103, x2(t) is the current absorbed by a second homogeneous device, i.e. a second electric motor associated with a second door 103, xn(t) is the current absorbed by an nth homogeneous device, i.e. by an nth electric motor associated with an nth door 103.

A second non-exclusive example of operating quantity Y(t), different from X(y), is represented by the set of pulse counters for activating the braking solenoid valve belonging to each of the braking systems 102 of the same vehicle 101 or train 100, where y1(t) is the value of the activation pulse counter of a first homogeneous device, i.e., the braking solenoid valve belonging to a first braking system 102, y2(t) is the value of the activation pulse counter of a second homogeneous device, i.e., the braking solenoid valve belonging to a second braking system 102, and yn(t) is the value of the pulse counter for activation of an nth homogeneous device, i.e., the braking solenoid valve belonging to an nth braking system 102.

A third non-exclusive example of operating quantity Z(t), different from X(y), is represented by the set of thickness values of the brake pads (or brake shoes) belonging to each braking unit 102 of the same vehicle 101 or train 100, the thickness value of the brake pad (or of the brake shoe) being an index of the level of wear of the friction material. In the example, z1(t) is the thickness of the brake pad belonging to a first braking unit 102, z2(t) is the thickness of the brake pad belonging to a second homogeneous device, i.e., the brake pad (or brake shoe) belonging to a second braking unit 102, zn(t) is the thickness of the brake pad (or brake shoe) of an nth homogeneous device, i.e., the brake pad belonging to an nth braking unit 102.

One or more diagnostic means 210 may receive, through the communication means 211, the operating quantities X(t), Y(t), . . . , acquired or generated by one or more control means 201, possibly preprocessed by said preprocessing functions 208, 207.

The one or more diagnostic means 210 may be centralized in a centralized diagnostic unit 213, or the one or more diagnostic means 210 may be distributed on a plurality of control means 201, 204, assuming the form indicated with 210' in FIG. 2.

In other words, the diagnostic means 210 may be an algorithm executed inside a centralized diagnostic unit 213, or the diagnostic means 210' may be one or more executed algorithms distributed in the plurality of control means 201, 204.

Further details on the functioning of the diagnostic means are provided below.

The diagnostic means 210, 210' are arranged to perform analysis operations on the plurality of values $x1(t_i, t_{i+1}, t_{i+2}, \ldots)$, $x2(t_i, t_{i+1}, t_{i+2}, \ldots)$ belonging to the operating quantity X(t), in order to identify deviations in behavior of one or more of said values of the plurality of values $x1(t_i, t_{i+1}, t_{i+2}, \ldots)$, $x2(t_i, t_{i+1}, t_{i+2}, \ldots)$, which indicate the occurrence of a fault, malfunction, or a maintenance need due to aging in the monitored systems and/or their associated components.

Upon the occurrence of a fault, a malfunction, or an end-of-life assessment of a component, the diagnostic means 210, 210' may be arranged to activate an alarm indication, possibly coded to indicate its source and nature, and possibly associated with one or more items of diagnostic information characteristic of the nature of the alarm.

After its generation, the alarm and any associated values are transmitted, by the diagnostic means that have generated said alarm, to a ground center for data collection and alarm management, through wireless transmission means associated with said diagnostic means, or with a unit 214 on board the train, capable of processing the alarms received and sending them to the driver and/or to the TCMS (Train Control and Monitoring System), which in turn may transmit said alarm and associated data to the ground collection center.

The unit 214 may be an independent unit, or it may coincide with one or more of the control means 201, 204, or it may also coincide with a TCMS system.

Several diagnostic means 210, 210' may be active on the same railway vehicle 101 or train 100, wherein each of which may be arranged to analyze one or more common operating quantities X(t), Y(t), . . . .

In one embodiment, the diagnostic means 210, 210' may be arranged to determine the reference value Mx, My, . . . by taking the average of at least two values of the plurality of values $x1(t_i, t_{i+1}, t_{i+2}, \ldots)$, $x2(t_i, t_{i+1}, t_{i+2}, \ldots)$; $y1(t_i, t_{i+1}, t_{i+2}, \ldots)$, $y2(t_i, t_{i+1}, t_{i+2}, \ldots)$, acquired in an acquisition instant.

In this way, the analysis of an operating quantity Y(t) may be based on the comparison of each value of said plurality of values $y1(t_i, t_{i+1}, t_{i+2}, \ldots)$, $y2(t_i, t_{i+1}, t_{i+2}, \ldots)$ associated with said operative quantity Y(t) with the average My of said operative quantity Y(t).

Figure 3A:
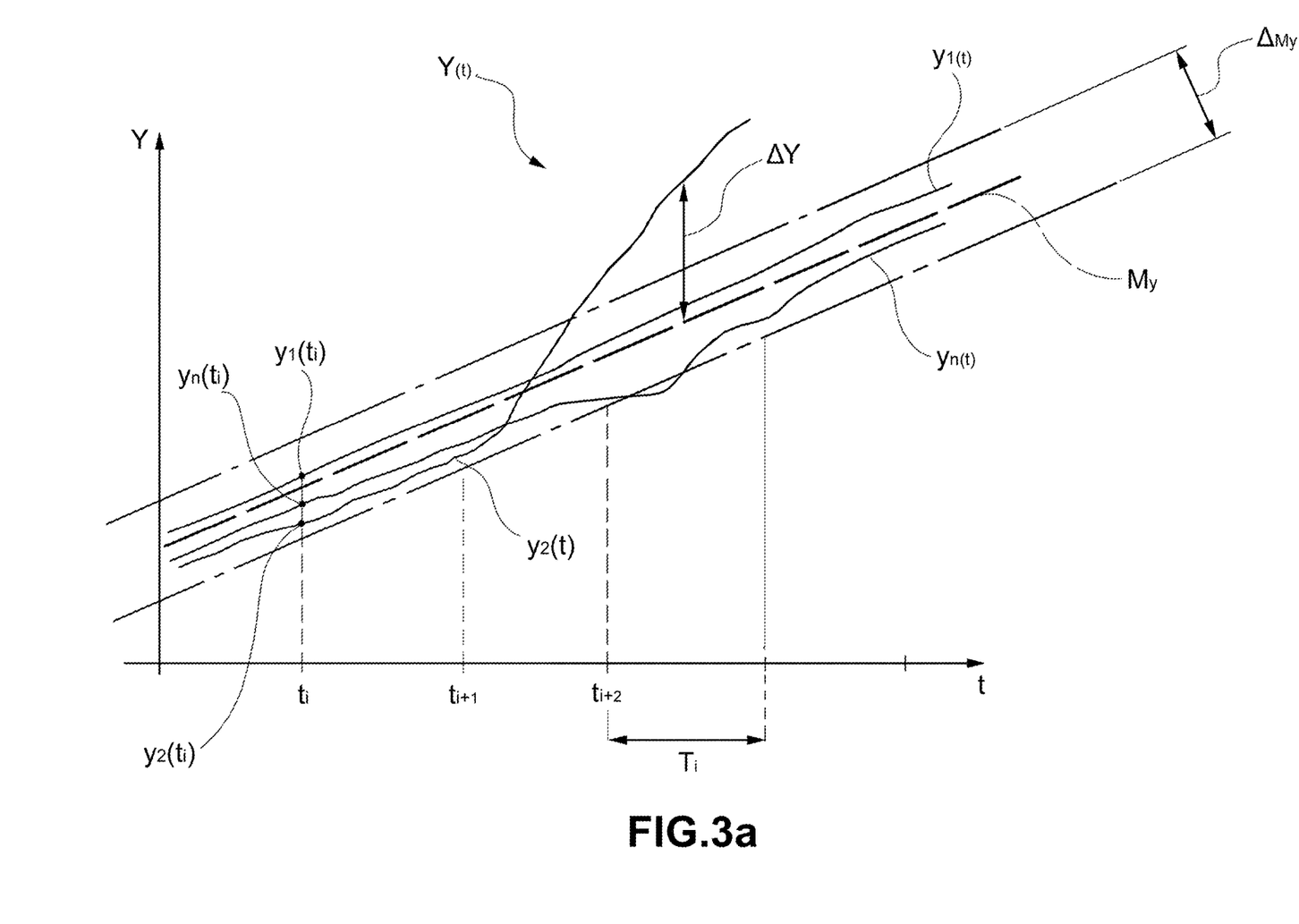
FIG. 3a and FIG. 3b show curves representing various values of respective operating quantities as a function of time.

FIG. 3a shows curves $y_1(t)$, $y_2(t)$, . . . $y_n(t)$ representing the various values of the operating quantity Y(t) as a function of time.

Figure 3B:
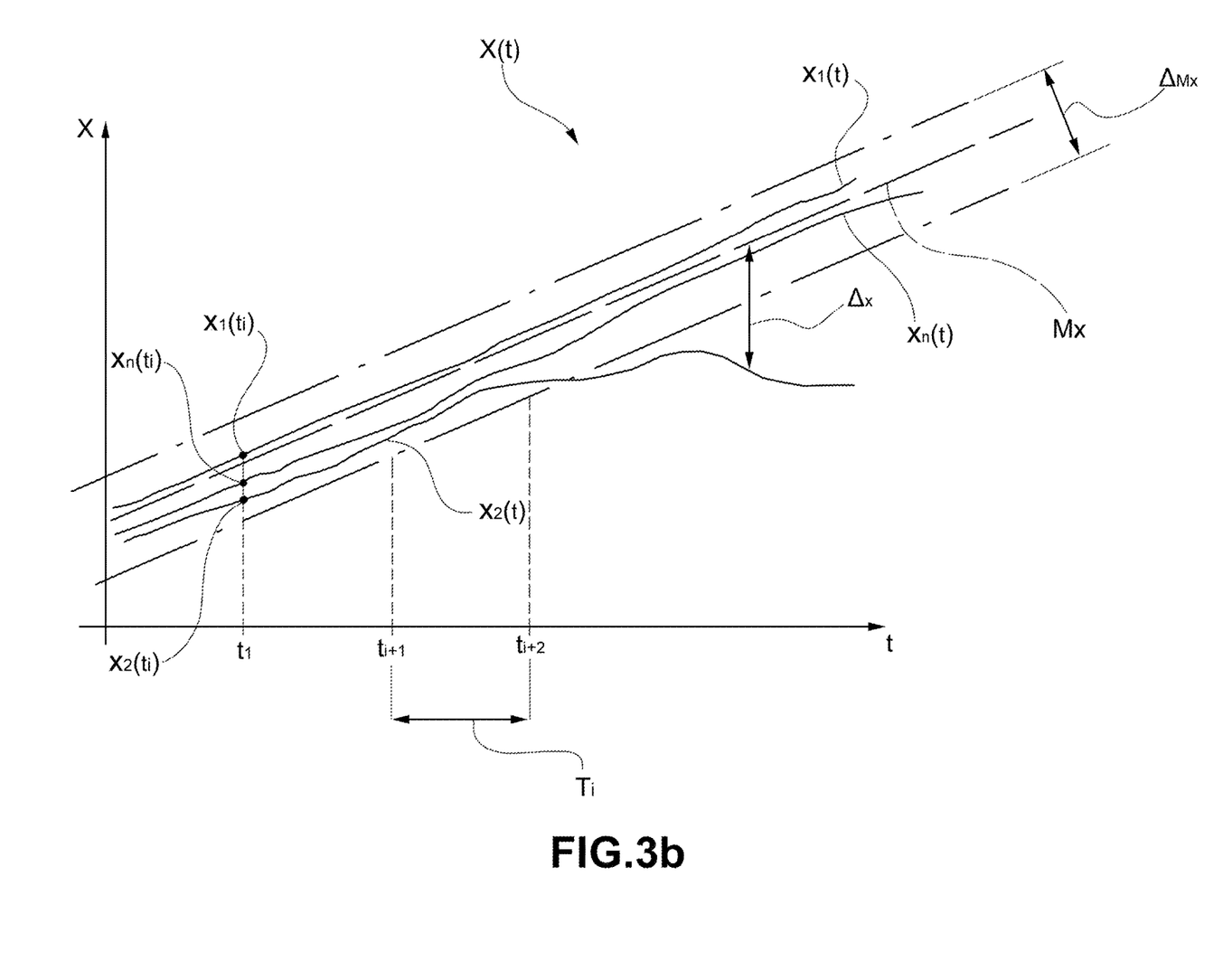

FIG. 3b shows curves $x_1(t)$, $x_2(t)$, . . . $x_n(t)$ representing the various values of the operating quantity X(t) as a function of time.

As previously mentioned, the diagnostic means may be set up to determine the reference value Mx, My, . . . at each acquisition instant, i.e., in accordance with the acquisition period T.

The diagnostic means 210, 210' may calculate the reference value by taking the average My of the values $y_1(t_i, t_{i+1}, t_{i+2}, \ldots)$, $y_2(t_i, t_{i+1}, t_{i+2}, \ldots)$, . . . $y_n(t_i, t_{i+1}, t_{i+2}, \ldots)$, possibly filtered in a time window Δt adequate to eliminate any statistical noise.

Subsequently, the diagnostic means 210, 210' may be arranged to compare each value $y1(t_i, t_{i+1}, t_{i+2}, \ldots)$, $y2(t_i, t_{i+1}, t_{i+2}, \ldots)$, $yn(t_i, t_{i+1}, t_{i+2}, \ldots)$ with the reference value My, i.e. with the mean.

Should a difference Δy between the individual value of each value of the plurality of values $y1(t_i, t_{i+1}, t_{i+2}, \ldots)$, $y2(t_i, t_{i+1}, t_{i+2}, \ldots)$ and the reference value My, i.e., the mean, exceeds a predetermined neighborhood of values ΔM indicative of a condition of incorrect operation, the diagnostic means are arranged to emit an alarm signal.

Not exclusively, the neighborhood of values ΔM may be a tolerance band around the average My.

Not exclusively, the neighborhood of values ΔM may be a constant neighborhood.

Not exclusively, the neighborhood of values ΔM may be expressed as a percentage value, possibly with double positive and negative sign, of the reference value for comparison, or rather of the average M. This solution offers the advantage of automatically adapting to possible variations over time of the full scale.

Not exclusively, the neighborhood of values ΔM may be expressed as a function of the variance of the at least one operating quantity y1(t), y2(t), . . . yn(t). This solution offers the advantage of automatically adapting to the variability of the data.

Not exclusively, the neighborhood of values ΔM may be expressed as a set of one or more solutions described above, and of time. This solution offers the advantage of automatically adapting not only to the nature of the data, but also to the dependence on time, such as expected variations due to aging.

An example is the counter of the activation number of a specific solenoid valve present in all the homogeneous braking systems 102, for example the braking systems associated with the motor bogies.

It is expected that the number of activations of said specific solenoid valve is on average the same for all the braking systems 102 belonging to the same type of bogie. Potential short-term variations are masked by numerical filtering with a time window Δt. A significant deviation from the average value of accumulated pulses of a pneumatic solenoid valve may indicate, for example, a pneumatic leakage of the braking system associated with said pneumatic solenoid valve.

If a given first operating quantity X(t) to be analyzed is affected in a different way by localized non-uniform situations of the train, it is expedient to identify at least one second operating quantity Y(t) related to the localized non-uniform situations of the train and to normalize the first operating quantity X(t) to be analyzed according to the second operating quantity Y(t).

The diagnostic means may be arranged to normalize the first operating quantity X(t) at each acquisition instant.

By way of non-exclusive example, a braking system 102 associated with a load bogie may stress its pneumatic solenoid valves more than a braking system 102 associated with a motor bogie, since the braking system 102 associated with a motor bogie mainly uses the traction motors for braking.

In such case, it would not have signified comparing the activation pulse counters of a specific pneumatic solenoid valve in all the braking systems 102, whether they are associated with load bogies or motor bogies, as the curves relating to the solenoid valves associated with the load bogies would diverge in a short time from the curves relating to the solenoid valves associated with the motor bogies.

To resolve this disadvantage, by way of non-exclusive example, it is expedient that each control means 201, 204 associated with a braking system 102 acquires the maximum pressure value to the brake cylinder thereby produced for each braking and calculates continuously and locally its average value $\overline{P}$ and locally normalizes the value produced by the local counters of activation pulses of the homogeneous solenoid valves according to said average value $\overline{P}$, i.e., divides locally the value accumulated by the pulse counter by said average value $\overline{P}$ obtaining as a result the number of activations per [bar] produced.

In this way the normalized values of the activation pulse counters of the pneumatic solenoid valves will generate congruent values such that they may be used and compared again.

Further embodiments are always based substantially on the statistical approach. For example, it is possible for the diagnostic means 210, 210' to be arranged to:

a. calculate a first average value by calculating an average of the values of the plurality of values $x1(t_i, t_{i+1}, t_{i+2}, \ldots)$, $x2(t_i, t_{i+1}, t_{i+2}, \ldots)$; $y1(t_i, t_{i+1}, t_{i+2}, \ldots)$, $y2(t_i, t_{i+1}, t_{i+2}, \ldots)$ acquired in an acquisition instant;

b. identify the values of the plurality of values $x1(t_i, t_{i+1}, t_{i+2}, \ldots)$, $x2(t_i, t_{i+1}, t_{i+2}, \ldots)$; $y1(t_i, t_{i+1}, t_{i+2}, \ldots)$, $y2(t_i, t_{i+1}, t_{i+2}, \ldots)$ which are higher or lower by at least a given threshold value than the first average value;

c. determine the reference value Mx, My, . . . by calculating a second average value by calculating the average of the values of the plurality of values $(x1(t_i, t_{i+1}, t_{i+2}, \ldots), x2(t_i, t_{i+1}, t_{i+2}, \ldots); y1(t_i, t_{i+1}, t_{i+2}, \ldots), y2(t_i, t_{i+1}, t_{i+2}, \ldots))$ which have not been identified to be greater or less than the at least one given threshold value with respect to the first average value.

In other words, it is possible to identify values that are a value ±S away from the average My and recalculate the average M minus the identified values. Thus, a divergent value ym(t) lying beyond the distance ±S from the average M will not affect the definition of the reference value for calculating the neighborhood of the variation Δy, making the deviation estimate Δy more reliable.

If the observed operating quantity Y(t) is dependent on a plurality of operating quantities H(t), K(t), . . . J(t), a normalization process becomes complex.

If the observed operating quantity Y(t) is dependent on a plurality of operating quantities H(t), K(t), . . . J(t), it is possible to use a neural network as a self-learning and self-calibrating algorithm on board the train. The neural network may be set up to calculate continuously the reference value for the comparison of the plurality of values, advantageously avoiding the need for remote updates.

Figure 4:
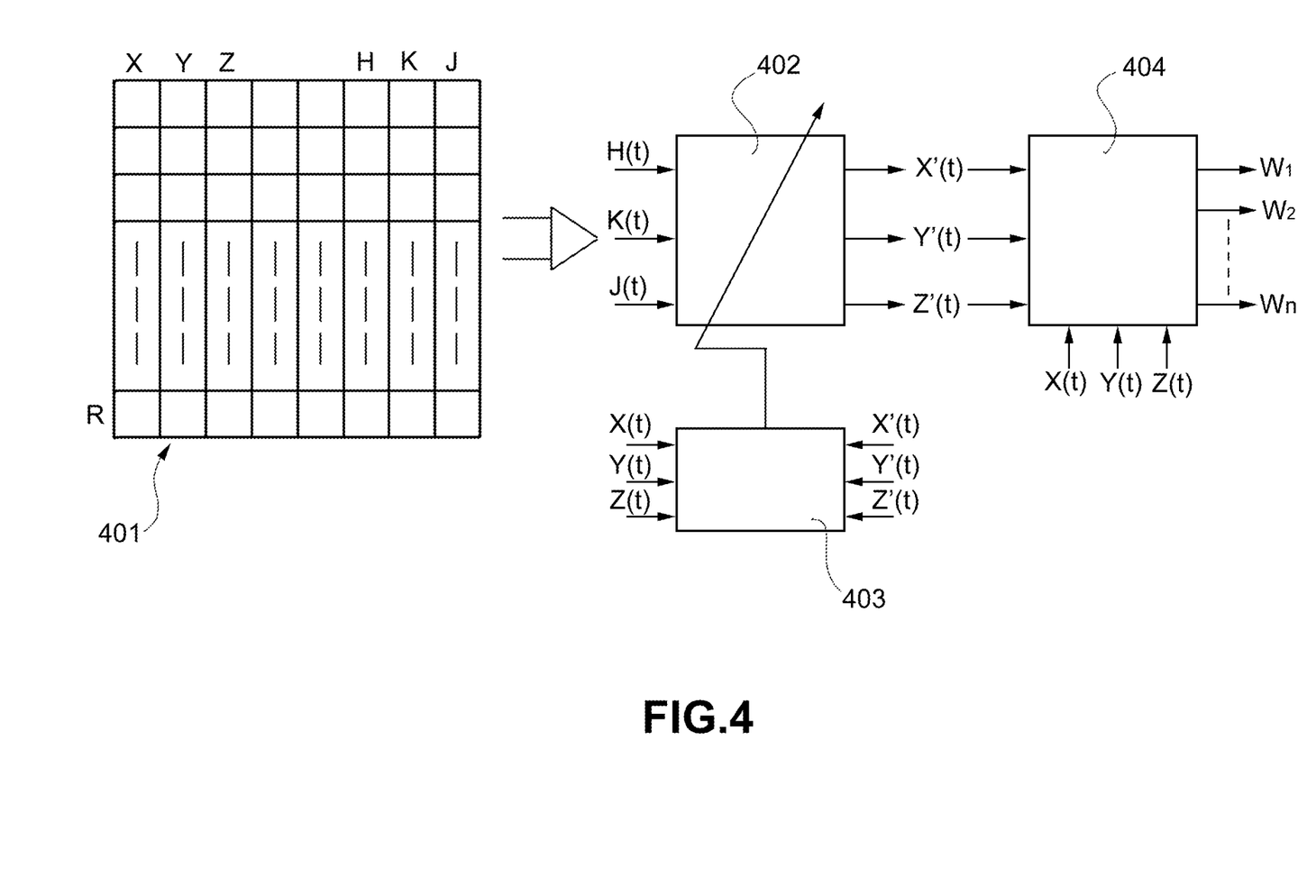
FIG. 4 shows an example of a circular buffer.

In FIG. 4, for example, a circular buffer 401 has a size of R records, each Rth record being structured, for example, to host one or more operating quantities X(t), Y(t), . . . Z(t) to be monitored, and the one or more operating quantities H(t), K(t), . . . J(t) of which the behavior depends on the behavior of one or more operating quantities X(t), Y(t), . . . Z(t) to be monitored.

Figure 5:
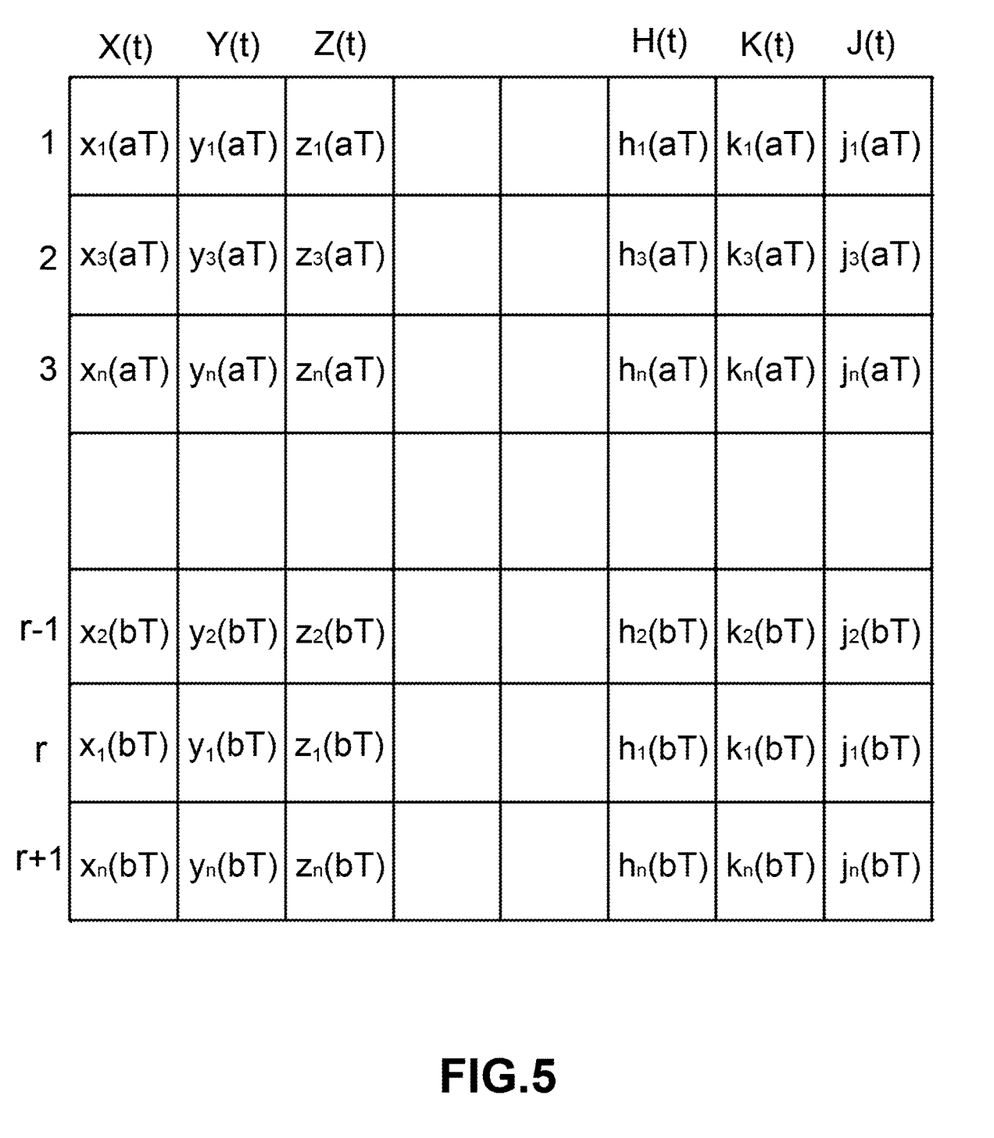
FIG. 5 shows in detail a possible format of records contained in a circular buffer.

FIG. 5 shows in greater detail a possible format of the records contained in the circular buffer 401.

In the non-exclusive example of FIG. 5, the first record is generated at the instant aT by the electronic control unit 1 and sent to the diagnostic means 210, 210'. The first record contains the values x1(aT), y1(aT), z1(aT), h1(aT), k1(aT), j1(aT) associated with the control means 1.

The second record is generated at the instant aT by the control means 3 and is sent to the diagnostic means 210, 210'. The second record contains the values x3(aT), y3(aT), z3(aT), h3(aT), k3(aT), j3(aT) associated with the control means 3.

The third record is generated at the instant aT by the control means n and sent to the diagnostic means 210, 210'. The third record contains the values xn(aT), yn(aT), zn(aT), hn(aT), kn(aT), jn(aT) associated with said control means n.

The r1st record is generated at the instant bT>aT by the control means 2 and sent to the diagnostic means 210, 210'. The r1st record contains the values x2(bT), y2(bT), z2(bT), h2(bT), k2(bT), j2(bT) associated with said control means 2.

The rth record is generated at the instant bT>aT by the control means 1 and sent to the diagnostic means 210, 210'. The rth record contains the values x1(bT), y1(bT), z1(bT), h1(bT), kl(bT), j1(bT) associated with the control means 1.

R must be sized to be able to store at least the number of records deemed necessary to perform effective training of the neural network.

A neural network 402, the construction of which is prior art, may be set up to receive one or more operating quantities H(t), K(t), ... J(t) at the input and to generate at the output one or more image quantities X'(t), Y'(t), ... Z'(t), associated with the respective homogeneous quantity to be monitored X(t), Y(t), ... Z(t).

There may be a training algorithm 403 to receive the operating quantities X(t), Y(t), ... Z(t) to be monitored and the image quantities X'(t), Y'(t), ... Z'(t) and to act on the internal coefficients of the neural network 402 by minimizing the error existing between each operating quantity X(t), Y(t), ... Z(t) to be monitored and the associated image operating quantity X'(t), Y'(t), ... Z'(t).

The training algorithm may be, but not exclusively, a backpropagation algorithm.

The diagnostic means 210, 210' may receive the records from the control means 201, 204 through the communication means 211 and may provide for storing them in the circular buffer.

If necessary, the transmission of the records by the control means 201, 204 to the diagnostic means 210, 210' may take place in a synchronized manner to ensure the temporal congruence of the transmitted records.

The time value of the transmission instant of the single record by the control means 201, 204 may become one of the operating quantities H(t), K(t), ... J(t).

When the buffer has accumulated a quantity of records Q≤R, the diagnostic means 210, 210' may start the training process of the neural network 402 by activating the training algorithm 403, which will use the set Q of records to carry out the training action.

The parameter Q may be defined not exclusively in the design phase of the diagnostic means 210, 210' on the basis of experience relating to how long it is necessary to accumulate a significant number of records useful for a reliable training of the neural network 402.

By way of non-exclusive example, significant information for diagnostic use may be stored with a period of one hour, and therefore a training based on the history of six months of service, 16 hours of daily service, requires 2,880 records transmitted by each control means 201, 204 associated with the operating quantities X(t), Y(t), ... Z(t), H(t), K(t), ... J(t) during the first six months of service, so in this case Q=2,880·U, where U is the number of control means associated with the operating quantities X(t), Y(t), ... Z(t), H(t), K(t), ... J(t).

During the accumulation period of the quantity Q of records, which occurs when the vehicle has just been tested and just put into service, the devices associated with the operating quantities y1, y2, ... yn to be monitored must therefore perform their function correctly, i.e., they are free from malfunction or fault.

A malfunction condition associated with the value yn(t) during the collection of Q records would give rise to an incorrect set of data with consequent incorrect training of the neural network with regard to the operating quantity Y(t).

By way of example, this disadvantage may be overcome by evaluating the samples of the quantities to be monitored during the accumulation phase of the Q records, with the previously described statistical methods, eliminating the deviant value from the training process and generating an alarm report.

After the training, the image quantities X'(t), Y'(t), ... Z'(t) are considered reliably representative of the real behavior of the associated operating quantities X(t), Y(t), ... Z(t) to be monitored.

Once the training has been carried out, for each new nth incoming record, the diagnostic means 210, 210' may be set up to pass the plurality of incoming values of the operating quantities H(t), K(t), ... J(t) directly to the neural network 402 and may activate a comparison algorithm 404 arranged to compare each operating quantity X(t), Y(t), ... Z(t) to be monitored with each value of the associated operating image quantity X'(t), Y'(t), ... Z'(t) and to generate an associated status report W1, W2, ... Wn.

The comparison algorithm 404 operates, for example, by checking that the differences between each value of the operating quantity X(t), Y(t), ... Z(t) to be monitored and each value of the associated image quantity X'(t), Y'(t), ... Z'(t) do not exceed predetermined values ΔM1, ΔM2, ... ΔMn, each associated with the operating quantities X(t), Y(t), ... Z(t) to be monitored, the predetermined values ΔM1, ΔM2, ... ΔMn being stored in the non-volatile memory portion associated with the diagnostic means 210, 210'.

Further, the comparison algorithm 404 may operate, for example, by checking that the derivatives of the differences between each value of the operating quantity X(t), Y(t), ... Z(t) to be monitored and each value of the associated image quantity X'(t), Y'(t), ... Z'(t) do not exceed predetermined values ΔD1, ΔD2, ... ΔDn, associated with the operating quantities X(t), Y(t), ... Z(t) to be monitored, stored in the non-volatile memory portion associated with the diagnostic means 210, 210'.

The diagnostic information W1, W2, ... Wn may assume, for example, a range of at least two values indicating at least two levels of severity of the state of the associated observed operating quantity, for example but not exclusively PASS, FAIL.

The diagnostic means 210, 210' may be arranged to take into account environmental and/or operational variations of the train over its life.

In this case, the diagnostic means 210, 210' may continue to store the incoming records in the circular buffer 401, and periodically activate the training algorithm 403 to update internal coefficients of the neural network 402 according to the new operating conditions, keeping the image quantities X'(t), Y'(t), ... Z'(t) accurate continuously over time, advantageously, without the need for external correction or recalibration.

A further advantage of using the solution described in FIG. 4 is represented by the fact that a suitably sized neural network becomes extremely representative of the history prior to the last data stored in the circular buffer 401. By being able to download the coefficients of the neural network 402 during the maintenance phase of the associated device 202, 205, the history of said associated device may be obtained with good approximation.

The limitations of the embodiment disclosed above constitute a currently preferred embodiment but may be varied without thereby departing from the broader scope defined in the main claim.

The advantage achieved is therefore that of obtaining a solution which resolves the counterproductive cases of known monitoring systems, through a solution with reduced complexity and costs.

Various aspects and embodiments of a procedure for setting up a monitoring system according to the invention have been described. It is understood that each embodiment may be combined with any other embodiment. Furthermore, the invention is not limited to the described embodiments, but may be varied within the scope defined by the appended claims.

The invention claimed is:

1. Monitoring system for at least one plurality of devices, which are homogeneous, of at least one vehicle, wherein a functional state of each device is represented by a respective value of at least one operating quantity common to said plurality of devices;
the monitoring system comprising:
at least one control means arranged to acquire, in a temporal succession of acquisition instants determined on the basis of a predetermined acquisition period, a plurality of values of said at least one operating quantity; each value of said plurality of values being representative of the functional state of a respective device of said at least one plurality of devices in one acquisition instant;
diagnostic means arranged to receive, through a communication means, the plurality of values acquired in one acquisition instant, and to detect an operating anomaly or a request for maintenance by at least one device of said at least one plurality of devices as a function of a comparison, for each acquisition instant, of said plurality of values received with at least a range of reference values;
the range of reference values comprising a reference value and a neighborhood of values associated with said reference value;
the reference value being determined by said diagnostic means as a function of at least two values of said plurality of values acquired in one acquisition instant.

2. The monitoring system according to claim 1, wherein the diagnostic means are arranged to determine the presence of the malfunction or maintenance request by at least one device of said at least one plurality of devices when at least one of said values of said plurality of values is not within the range of reference values.

3. The monitoring system according to claim 1, wherein the diagnostic means are arranged to determine the reference value at each acquisition instant.

4. The monitoring system according to claim 1, wherein the diagnostic means are arranged to determine the reference value by calculating an average between at least two values of said plurality of values acquired in one acquisition instant.

5. The monitoring system according to claim 1, wherein the diagnostic means are arranged for:
determining a first average value by calculating an average of the values of the plurality of values acquired in one acquisition instant;
identifying the values of the plurality of values which are greater or less than at least a given threshold value with respect to the first average value;
determining the reference value through the determination of a second average value by calculating the average of the values of said plurality of values that have not been identified to be greater or less than at least the given threshold value with respect to the first average value.

6. The monitoring system according to claim 1, wherein said diagnostic means are arranged to determine the neighborhood of values as a function of a percentage value of the reference value.

7. The monitoring system according to claim 1, wherein said diagnostic means are arranged to determine the neighborhood of values as a function of a variance of the at least one operating quantity.

8. The monitoring system according to claim 1, wherein the operating quantities are at least two, that is, at least a first operating quantity and a second operating quantity;
said diagnostic means being arranged to normalize the first operating quantity as a function of the at least one second operating quantity.

9. The monitoring system according to claim 1, wherein the diagnostic means are arranged to determine the reference value by means of a neural network.

10. The monitoring system according to claim 9, wherein the diagnostic means are arranged to perform a first training of said neural network, by means of a training algorithm associated with said neural network;
the first training being carried out using a predetermined quantity Q of values of the plurality of values previously acquired by the at least one control means.

11. The monitoring system according to claim 10, wherein, after carrying out the first training, the diagnostic means are arranged to perform further training in a temporal succession of training instants determined according to a predetermined training period, by means of the training algorithm;
the training algorithm using the predetermined quantity Q of values of the plurality of values acquired by the at least one control means between a current sampling instant and the previous sampling instant.

12. The monitoring system according to claim 10, wherein the training algorithm is a backpropagation algorithm.

13. The monitoring system according to claim 1, wherein the diagnostic means are centralized in an electronic diagnostic unit.

14. The monitoring system according to claim 1, wherein the diagnostic means are distributed over a plurality of control means.

15. The monitoring system according to claim 1, wherein the at least one operating quantity comprises values directly acquired or generated by the at least one control means or values entered manually or remotely from the outside.

16. The monitoring system according to claim 1, wherein the at least one operating quantity comprises values obtained from preprocessing performed by the at least one control means on the at least one operating quantity directly acquired or generated by said at least one control means.

17. The monitoring system according to claim 1, wherein the diagnostic means are arranged to provide diagnostic indications divided according to at least two levels of severity.

18. The monitoring system according to claim 1, wherein the diagnostic means are arranged to transmit the diagnostic indications to a further unit or module on board the train.

19. The monitoring system according to claim 1, wherein the diagnostic means are arranged to transmit the diagnostic indications via a wireless connection.

20. A monitoring system comprising:
at least one electronic control unit arranged to acquire, in a temporal succession of acquisition instants in a predetermined acquisition period, a plurality of values of at least one operating quantity of a plurality of homogenous devices of at least one vehicle, wherein each value of said plurality of values is representative of a functional state of a respective device of said plurality of homogeneous devices in one acquisition instant; and a diagnostic unit arranged to receive, via wired or wireless communication, the plurality of values acquired in one acquisition instant, and to detect an operating anomaly or a request for maintenance by at least one device of said plurality of devices as a function of a comparison, for each acquisition instant, of said plurality of values received with at least a range of reference values;

the range of reference values comprising a reference value and a neighborhood of values associated with the reference value;

and the diagnostic unit arranged to determine the reference value as a function of at least two values of said plurality of values acquired in one acquisition instant.

\* \* \* \* \*